L. K. STRATE.
AUTOMATIC FILM WINDING MECHANISM FOR CAMERAS.
APPLICATION FILED JAN. 12, 1917.
1,233,929.
Patented July 17, 1917.
3 SHEETS—SHEET 1.
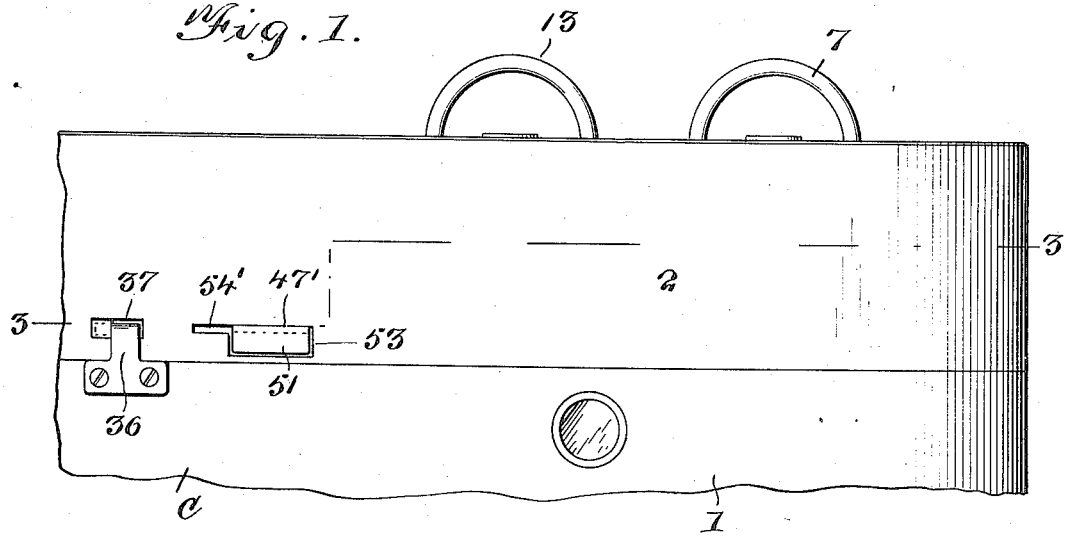
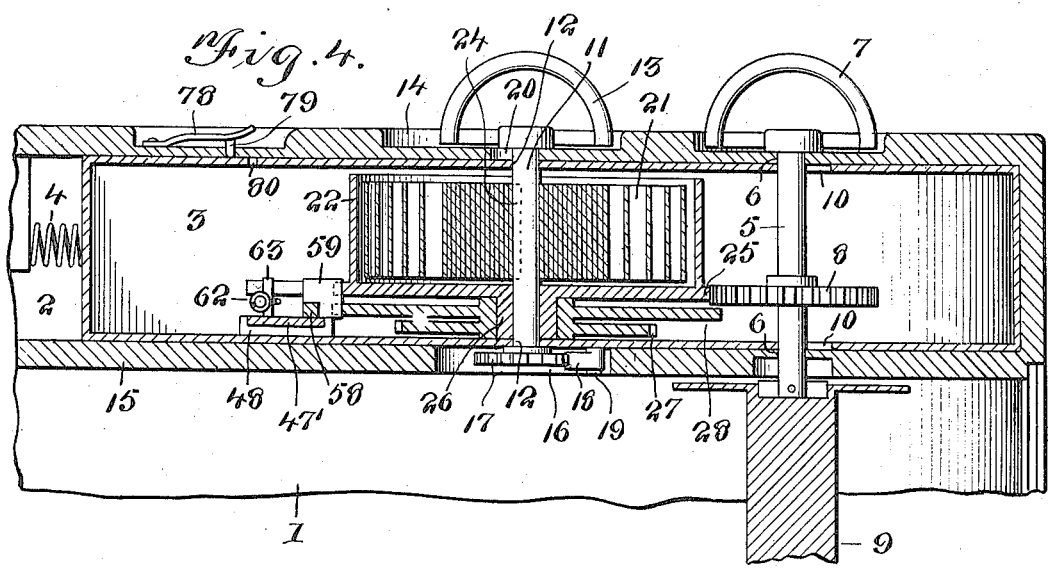
Witnesses
E. R. Ruppert.
J. W. Garner
Inventor
L. K. Strate
By Victor J. Evans
Attorney

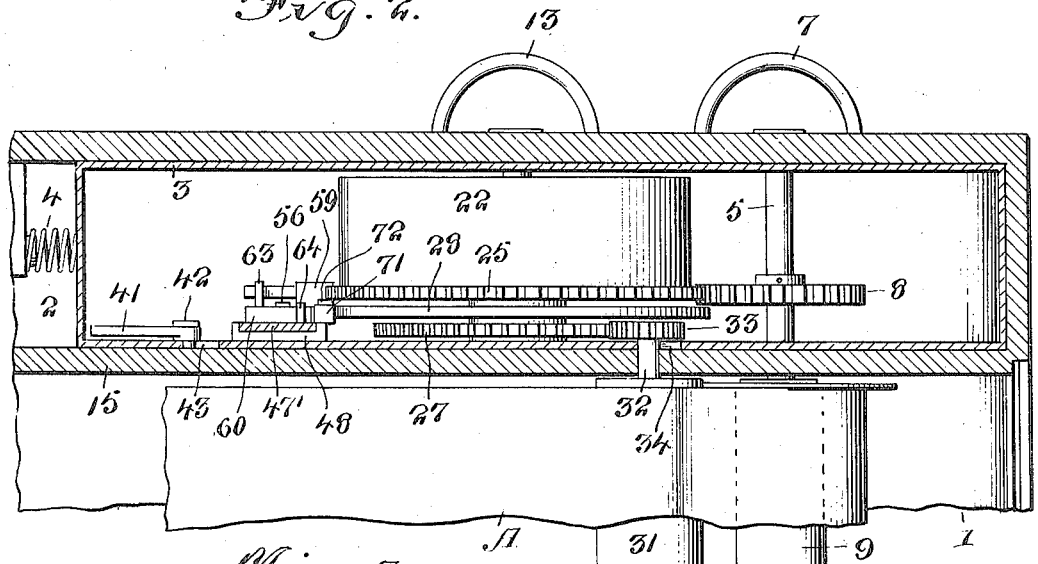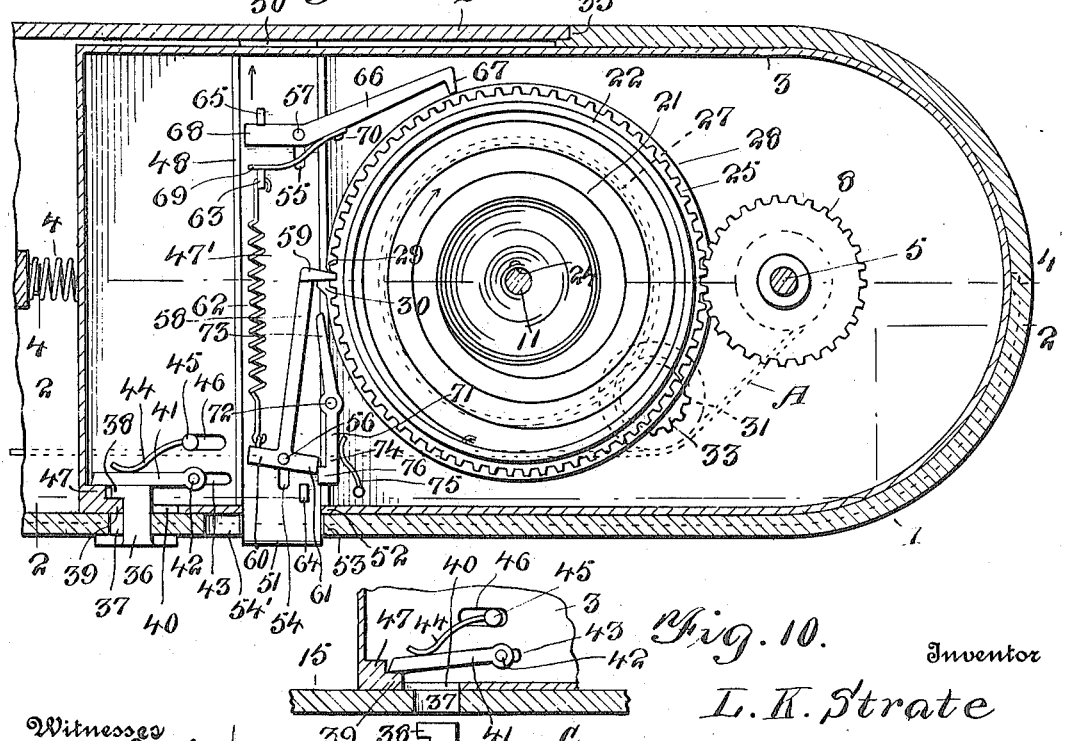

L. K. STRATE.
AUTOMATIC FILM WINDING MECHANISM FOR CAMERAS.
APPLICATION FILED JAN. 12, 1917.
1,233,929.
Patented July 17, 1917.
3 SHEETS—SHEET 3.
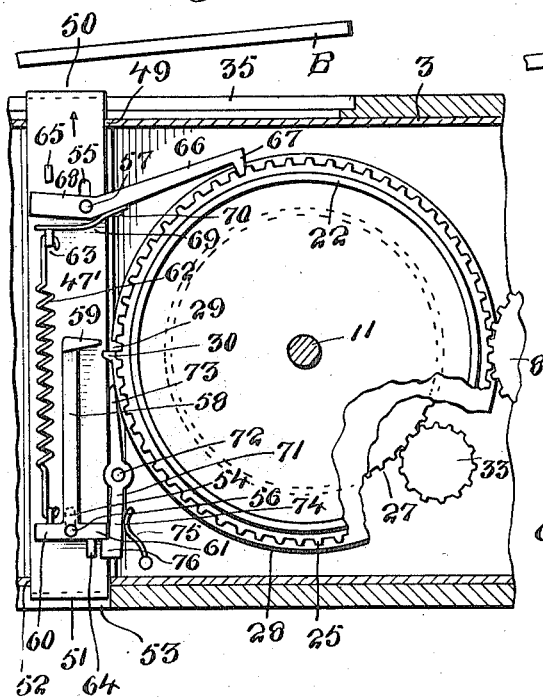
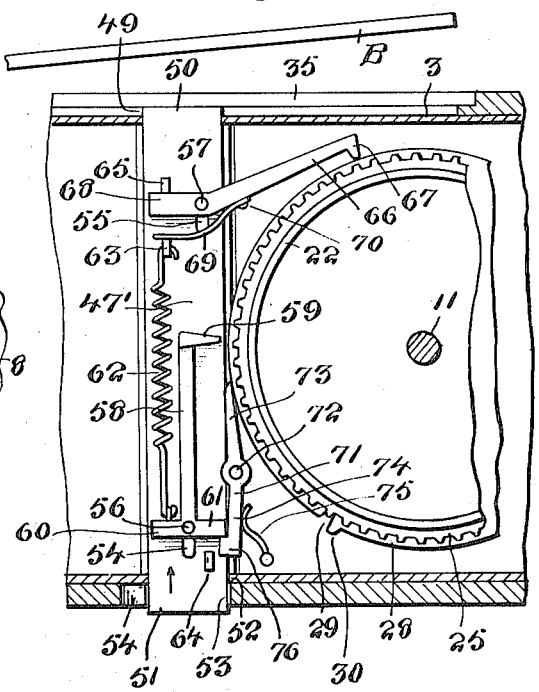
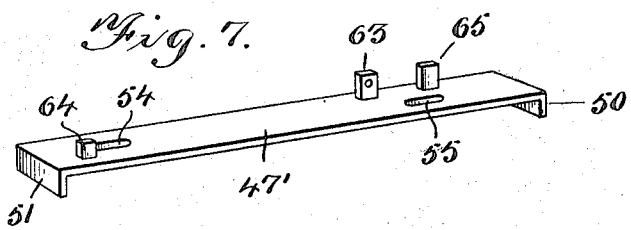
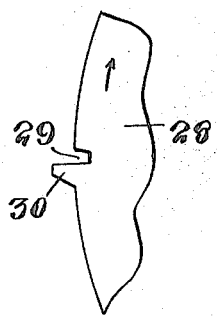
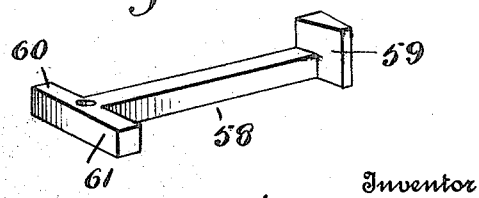
Inventor
L. K. Strate
By Victor J. Evans
Attorney
Witnesses

UNITED STATES PATENT OFFICE.

LESTER K. STRATE, OF SUTTON, NEBRASKA.

AUTOMATIC FILM-WINDING MECHANISM FOR CAMERAS.

1,233,929. Specification of Letters Patent. Patented July 17, 1917.

Application filed January 12, 1917. Serial No. 142,086.

*To all whom it may concern:*

Be it known that I, LESTER K. STRATE, a citizen of the United States, residing at Sutton, in the county of Clay and State of Nebraska, have invented new and useful Improvements in Automatic Film-Winding Mechanism for Cameras, of which the following is a specification.

This invention is an improved automatic film winding mechanism for use in cameras and in connection with a roll of film to arrange successive sections of the film behind the lens for exposure and hence enable a number of exposures to be made in rapid succession, the object of the invention being to provide an improved film winding mechanism of this character which is simple in construction, which can not be casually put in operation, which is positive in action and by means of which the exact length or section of film required is arranged for each exposure.

The invention consists in the construction, combination and arrangement of the devices hereinafter described and claimed.

In the accompanying drawings:

Figure 1 is a side elevation of a portion of a camera provided with automatic film winding mechanism constructed and arranged in accordance with my invention.

Fig. 2 is a vertical longitudinal sectional view of the same.

Fig. 3 is a horizontal sectional view of the same taken on the plane indicated by the line 3—3 of Fig. 1.

Fig. 4 is a vertical sectional view of the same taken on a plane indicated by the line 4—4 of Fig. 3.

Fig. 5 is a detailed horizontal sectional view showing the parts in one position.

Fig. 6 is a similar view showing the parts in another position.

Fig. 7 is a detailed perspective view of the slide.

Fig. 8 is a fragmentary elevation of the stop disk.

Fig. 9 is a detailed perspective view of the detent.

Fig. 10 is a detailed sectional view.

The camera 1 may be of any suitable construction and in accordance with my invention is provided with a chamber 2 in the upper side. A cage 3 which carries the film winding mechanism is arranged in the chamber 2 for slight longitudinal movement and is moved in one direction by a spring 4. The shaft 5 of the film winding key is mounted for rotation and also for vertical movement in bearing openings 6 in the upper and lower sides of the chamber 2 and said shaft or key is provided, in addition to the usual head 7 with a pinion 8, said pinion being fast to the shaft. The spool for winding the film, is indicated at 9. The upper and lower sides of the cage or carrier 3 are provided with slots 10 of suitable length and through which the film winding shaft or key 5 extends, said slots permitting the required slight longitudinal movement of the cage or carrier.

A shaft 11 is mounted for rotation in bearing openings 12 in the upper and lower sides of the cage and is provided at its upper end with a winding head 13 arranged in a recess 14 in the top of the camera. The partition or wall 15 of the camera which forms the bottom of the chamber 2 is provided with an opening 16. This opening clears and receives a ratchet wheel 17 which is secured to the lower end of the shaft 11. Said ratchet wheel is engaged by a spring pressed pawl 18 the pivot of which is indicated at 19. The top of the camera has a slot 20 to permit of movement of the shaft 11 with the cage or carrier, the opening 16 also permitting such movement of the shaft and the ratchet wheel 17 as will be understood.

A motor spring 21 is arranged in a drum 22, has its outer end attached to said drum as at 23 and has its inner end attached to the shaft 11 as at 24. The lower side of the drum is formed by a gear 25 which gear is adapted to engage the gear 8 when the cage 3 is moved in one direction by the spring 4 and to disengage said gear 8 when the cage is moved in the reverse direction, manually, by the instrumentality of the head 13 as will be understood. The gear and drum head 25 is loosely mounted on the shaft 11 and is provided with a hub or tubular element 26 which forms a bearing for a gear 27. A stop disk 28 is attached to and arranged on the upper side of the gear 27 said gear and stop disk being rigidly connected together and being both revoluble independently of the gear 25 as will be understood. The stop disk is provided with a peripheral notch 29 and with a stop tooth 30 at one side of said notch, said tooth projecting from the periphery of the disk as shown in Figs. 3, 5 and 6 and in detail in Fig. 8. A film roller 31 is in contact with the film A and its shaft 32 is provided with a pinion 33 which is adapted to engage the gear 27 when the cage is in gear engaging position and held by the spring 4. The bottom of the cage has a slot 34 through which the roller shaft 32 extends.

The usual front or door of the camera is indicated at B and when closed fits in a recess 35 in the outer wall or top of the chamber 2. The camera back is indicated at C and has a catch 36 which passes through an opening 37 in the rear wall of the chamber 2 and is provided with a projection 38 on one side, which projection is engaged by a shoulder 39 with which the cage or carrier 3 is provided, when said cage is in gear engaging position as shown in Fig. 3. The cage has an opening 40 to clear the catch. A gear lock 41 is here shown as a pawl mounted on a pivot 42 which operates in a slot 43 in the lower side of the cage. This gear lock is held by a weak spring 44 engaged on a shoulder 47 of the cage when the motor gear 25 is engaged with the gear 8. The said spring 44 is here shown as secured to a stud 45 which operates in a slot 46 in the bottom of the cage. When the cage is moved against the tension of the spring 4 to disengage the motor gear 25 from the gear 8 the gear lock 41 engages behind the shoulder 47 as shown in Fig. 10, thus locking said gears in disengaged relation. Such movement of the cage also disengages the shoulder 39 from the shoulder 38 of the catch 36 to permit the back to be removed if desired. But the back need not be taken off when the gears are disengaged as this would prevent the adjustment of the film to the first exposure which must necessarily be done by hand. The remainder of the paper on the last of the film must also be wound on the reel, by hand or otherwise, before the back is removed, to prevent the film from being light struck, as will be understood.

I also provide a primary and secondary detent actuating element 47' which is here shown as a slide mounted for slight longitudinal movement in a chamber guide 48 which is arranged transversely on the bottom of the cage 3. The case has an opening 49 in the wall or side opposed to the door B and through which one end 50 of the slide may project and the other end 51 of the slide extends through an opening 52 in the opposite side or wall of the cage and also extends through a slot 53 in the rear wall of that portion of the camera which forms the chamber 2. The ends 50, 51 of the slide are down-turned. The slot 53 discloses the slide end 51 and adapts the slide to be moved forwardly by the pressure of the thumb. To enable the slide to participate in the movements of the cage the rear wall of the chamber 2 is also provided with a slot 54' which communicates with the slot 53 and is of sufficient width to clear the slide. The slide is provided near its opposite ends with slots 54, 55 through which pivot studs 56, 57 respectively extend, the said pivot studs being attached to the bottom of the cage. A primary detent 58 is mounted on the pivoting stud 56 and has at its free end a broad tooth 59 which is adapted to be simultaneously engaged with the notch 29 of the stop disk 28 and also with any tooth of the gear 25 and as shown in Figs. 3 and 4. At its pivotal end the primary detent is provided with a T-shaped head providing arms 60, 61 which extend in opposite direction. The arm 60 is connected to one end of a coiled spring 62. The other end of said spring is connected to a lug 63 which projects from the upper side of the slide, the function of said spring being to engage the primary detent with the notch of the top disk and with a tooth of the gear 25 as herein before stated. The said slide also has a lug 64 near its rear end and a lug 65 near its front end. A secondary detent 66 is mounted on the pivot stud 57, is provided with a tooth 67 at the free end which is adapted to engage the gear 25 and the said secondary detent is provided with an arm 68 which is arranged in the path of the lug 65. A spring 69 is attached as at 70 to the secondary detent 66 and bears against the lug 63. A releaser 71 for the primary detent is mounted on a pivot 72 which projects upwardly from the bottom of the cage. Said releaser has an arm 73 which extends nearly to the periphery of the stop disk and within the path of the tooth or cam 30 of said disk. Said releaser also has an oppositely extending arm 74 which is engaged by a spring 75 and is provided with a shoulder 76 for engagement behind the arm 61 of the primary detent 58.

The operation of my invention is as follows: Let it be assumed that the camera is loaded, the cage held by the spring 4 with the gear 25 engaged with the pinion 8 of the film spool 9 and the first film exposed, such position of the automatic film winding mechanism being indicated in Figs. 2 and 3. The primary detent 58 is held by the spring 62 with its tooth 59 engaged with the stop notch 29 of the stop disk 28 and in the space between two of the teeth of the gear 25, the releaser 71 being held by the spring 75 with its shoulder 76 at one side of the end of the arm 61, and the slide 47 being held by the door B with its end 51 projected out through the opening 53 so that the lug 65 is brought into engagement with the arm 68 of the secondary detent 66 and the tooth 67 of the latter is held out of engagement with the gear 25. Let it be assumed that the spring 21 has been wound. The pinion 33 and the gear 27 are so proportioned and the film roller 31 is also so proportioned that when the winding spool is being driven by the spring motor mechanism the roller 31 by frictional engagement with the film will be rotated thereby and will cause the gear 33 to rotate the gear 27 and hence also the stop disk 28 through exactly one rotation while the required length of film for an exposure is passing the roller 31.

To expose the next section or required length of the film the door B must first be opened to permit of the operation of the slide 47' and said slide must be then pressed in the direction indicated by the arrow in Figs. 3, 5 and 6 to the position shown in Fig. 5. Such movement of the slide causes the lug 64 by engagement with the arm 61 of the primary detent 58 to turn the latter against the tension of the spring 62 a sufficient distance to disengage its broad tooth 59 from the notch 29 of the stop disk and also from a tooth of the gear 25. As the arm 61 passes the shoulder 76 of the releaser 71 the spring 75 turns the latter on its pivot 72 a sufficient distance to engage the arm 73 of the releaser on the periphery of the stop disk 28 at a point behind the cam tooth 30. The movement of the slide also causes its lug 65 to move beyond the arm 68 of the secondary detent 66 so that the lug 63 and the spring 69 turn said secondary detent on its pivot a sufficient distance to engage its tooth 67 with a tooth of the gear 25 so that the spring motor or mechanism is still held against operation. The operator by the pressure of his thumb against the end 51 of the slide holds the latter, against the tension of the spring 62 as long as desired. When the slide 47' is released the spring 62 returns the slide to its initial position thus causing the lug 64 to move away from the arm 61 of the primary detent 58 and the lug 65 to reëngage the arm 68 of the secondary detent 66 and thus turn the latter, against the tension of its spring 69 outwardly and release its tooth 67 from the gear 25 whereupon the spring 21 causes the gear 25 to revolve clockwise and hence the gear 8 which engages the gear 25 revolves the film spool 9 in the required direction to cause the spool to partly wind the film thereon. The movement of the film causes the roller 31 to rotate and hence the pinion 32 by engagement with the gear 27 rotates the latter and the stop disk 28 independently of the gear 25 but in the same direction. The stop disk makes one rotation, which as before stated corresponds with the required length of film for an exposure. As the said stop disk approaches the end of its rotation its cam tooth 30 moves under the arm 73 of the releaser 71, turning the latter a sufficient distance to disengage its shoulder 76 from the arm 61 of the primary detent 68, whereupon the spring 62 turns said detent so as to engage its broad tooth 59 with the periphery of the stop disk. Said stop disk is of slightly greater diameter than the gear 25 and hence the primary detent is kept out of engagement with the motor gear 25 until the completion of the rotation of the stop disk brings its notch 29 to register with the tooth of the primary detent, whereupon the latter by the spring 62 is caused to engage its tooth with said notch of the stop disk and also with a tooth of the gear 25, thus stopping the operation of the motor and hence also of the film winding spool.

It will be understood that when the door or front B of the camera is closed the slide can not be operated and hence the film winding mechanism is prevented from being casually set in motion. Owing to the provision of the movably mounted cage and the provision of the catch 36 and spring pressed element back releaser 41 the back is secured in closed position while the motor gears are engaged with the film spool and film roller gears and the back can not be released excepting by first moving the cage to gear disengaging position. To secure the cage in gear disengaging position and hence facilitate the removal of the film winding spool I provide a spring catch 78 which is secured on the camera case and is provided with a stud 79 which is adapted to engage in an opening 80 with which the cage is provided.

The slot 54' receives the slide 47' when the cage is moved against the tension of the spring 4 to disengage the motor gear 25 from the gear 8 so that the end 51 of the slide is arranged with a portion thereof at one side of the slot 54' and is caused to engage the rear wall of the chamber 2 and prevent the slide from moving or being moved to the position required to release the gear 25 and disk 28, so that the motor is prevented from operating while the said gears are disengaged.

While I have herein described and shown a preferred form of my invention I would have it understood that changes may be made in the form, proportion and construction of the several parts, without departing from the spirit of my invention and within the scope of the appended claims.

Having thus described my invention, what I claim is:

1. In winding mechanism of the class described, the combination of a spool element for winding a fabric thereon and provided with a gear, a roller for rotation by the fabric and also provided with a gear, a motor having a gear engaged with the gear of the spool element, a gear engaged and driven by the gear of the said roller independently of the motor gear, a stop element revoluble with the independently driven gear and a detent to engage the stop element and motor gear at the end of each rotation of said stop element and thereby predetermine the extent of movement of the fabric by the winding action of the spool element.

2. In winding mechanism of the class described, the combination of a spool element for winding a fabric thereon and having a gear, a roller for rotation by the fabric and also provided with a gear, a motor having a gear engaged with the gear of the spool element, a gear engaged and driven by the gear of the said roller, independently of the motor gear, a stop disk revoluble with the independently driven gear and having a stop notch and a cam tooth, a primary detent to engage the notch of the stop disk and to also engage a tooth of the motor gear, a spring to hold the primary detent in engaged position, a secondary detent arranged to engage the motor gear, a slide having a lug to hold the secondary detent in disengaged position when the slide is in normal position, said slide also having a lug to move the primary detent to disengaged position when the slide is operated, and a releaser to hold the primary detent in disengaged position, said releaser having an arm actuated by the cam tooth of the stop disk to cause said releaser to release the prime acting detent.

3. In winding mechanism of the class described, the combination of a spool element for winding a fabric thereon and having a gear, a roller for rotation by the fabric and also provided with a gear, a motor having a gear engaged with the gear of the spool element, a gear engaged and driven by the gear of the said roller, independently of the motor gear, a stop disk revoluble with the independently driven gear and having a stop notch and a cam tooth, a primary detent to engage the notch of the stop disk and to also engage a tooth of the motor gear, a spring to hold the primary detent in engaged position, a secondary detent arranged to engage the motor gear, a slide having a lug to hold the secondary detent in disengaged position when the slide is in normal position, said slide also having a lug to move the primary detent to disengaged position when the slide is operated, and a releaser to hold the primary detent in disengaged position, said releaser having an arm actuated by the cam tooth of the stop disk to cause said releaser to release the prime acting detent, and a spring to engage the primary detent, said spring also acting to normally hold the slide in initial position.

4. In a camera, a film winder, a movable element, a motor carried by the movable element and provided with means to engage and disengage the film winder, a movable controlling element for the motor, a door or front arranged to hold said controlling element in initial position, permitting the operation of the motor, when the door or front is closed, and means to prevent operation of the motor when the latter is disengaged from the film winder.

5. In a camera a film winding mechanism including a motor and a movable element in which the motor is mounted, a camera back, having a catch the said movable member having means to engage the catch and thereby lock the back in closed position when said movable element is in one position.

6. In a camera, a film winder, having a gear, a motor having a gear to engage and disengage that of the film winder, a movable element in which the motor is mounted, a camera back having a catch to lock the back in closed position when the movable element is in gear engaging position, a spring actuated lock held by said movable element in restrained position, when said movable element is in gear engaging position and adapted when the movable element is moved to gear disengaged position to hold said movable element in the last named position.

In testimony whereof I affix my signature.

LESTER K. STRATE.